UNITED STATES PATENT OFFICE.

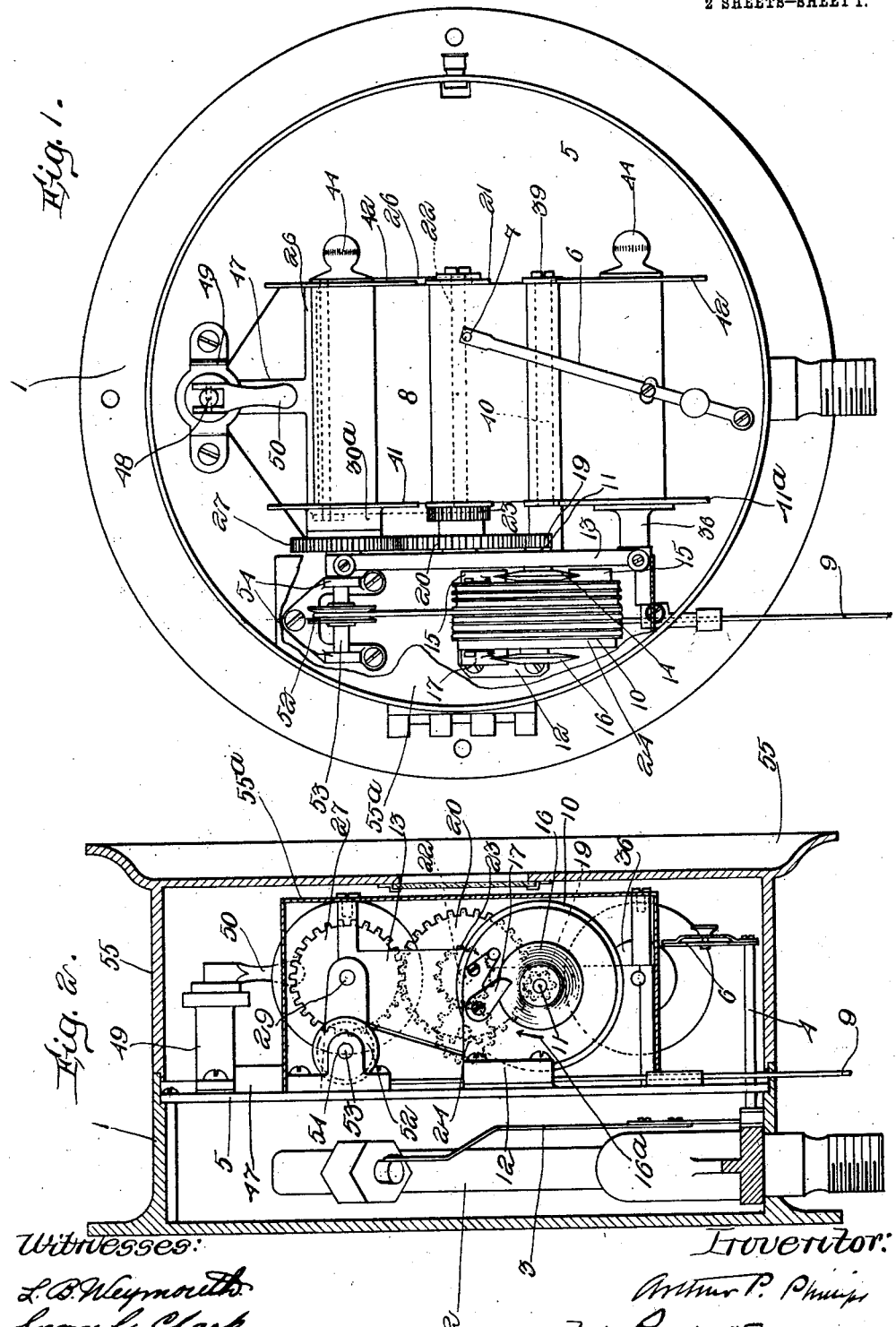

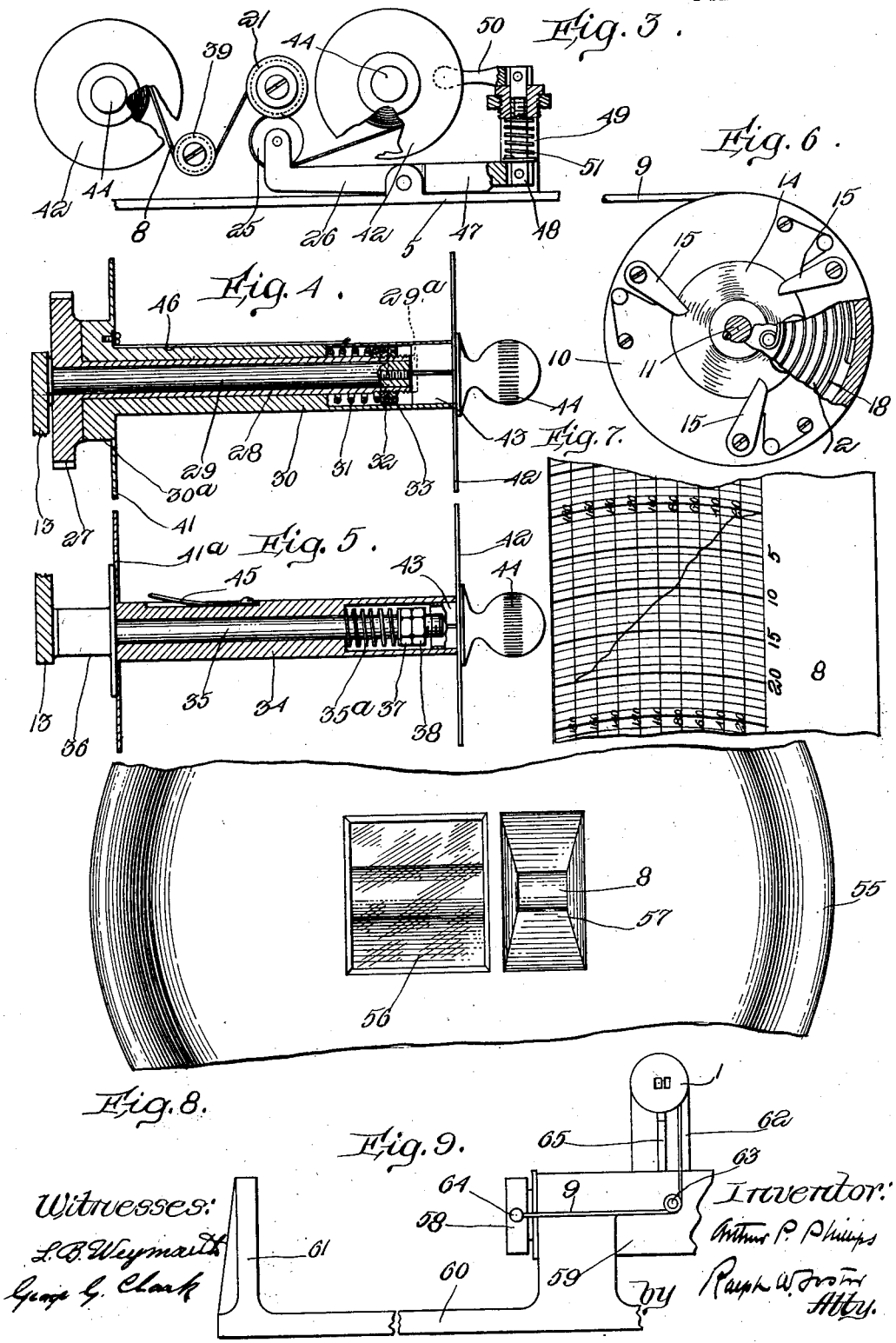

ARTHUR P. PHILLIPS, OF HAVERHILL, MASSACHUSETTS, ASSIGNOR TO CROSBY STEAM GAGE AND VALVE COMPANY, OF BOSTON, MASSACHUSETTS, A CORPORATION OF MASSACHUSETTS.

PRESSURE-RECORDING GAGE.

1,072,161.   Specification of Letters Patent.   Patented Sept. 2, 1913.

Application filed November 19, 1909. Serial No. 528,890.

*To all whom it may concern:*

Be it known that I, ARTHUR P. PHILLIPS, a citizen of the United States, and resident of Haverhill, in the county of Essex and State of Massachusetts, have invented certain new and useful Improvements in Pressure-Recording Gages, of which the following is a specification.

My invention relates to that class of pressure recording gages in which a record is made by moving a pencil over a moving chart and its object is to provide for automatically moving the chart in one direction only synchronously with the pencil in order to secure upon one chart a series of diagrams indicating the amount of pressure at each step or instant of a series of operations, for example the pressing of car wheels upon axles.

The invention may be considered an improvement on or a modification of my former invention, an application for Letters Patent for which was filed April 17, 1909 (Serial No. 490,537) and allowed August 23, 1909; the former invention providing for a series of diagrams taken on a rotary chart and, therefore, comparatively limited in number, while the present invention provides for a series of diagrams taken on a chart traveling in a straight path and, therefore, substantially unlimited in number.

It is illustrated by the accompanying drawings in which—

Figure 1 is a front elevation of the gage with the cover removed and with the hood partly broken away. Fig. 2 is a side view of the gage with the case and hood in section. Fig. 3 is an end view of the rolls looking from the right of Fig. 1. Fig. 4 is a sectional view partly in elevation of the winding roll. Fig. 5 is a sectional view partly in elevation of the paper roll. Fig. 6 is a view of the inner end of the cord drum with driving pawls. Fig. 7 is a view of the chart. Fig. 8 is a front elevation of the cover partly broken away. Fig. 9 is an elevation showing wheel press with the gage mounted thereon.

Similar characters refer to similar parts throughout the several drawings.

In the gage case 1 is mounted the pressure gage of a well-known type comprising Bourdon tube spring 2 connected by suitable mechanism 3 with and adapted to rotate shaft 4 which extends outwardly through plate 5 fastened to the gage case. Pencil arm 6, carrying pencil 7, is fixed to the outer end of shaft 4. Chart 8 travels behind said pencil and in contact therewith, being carried by rolls actuated by mechanism about to be described. Cord 9 has one end fastened to reciprocating drum 10 rotatably mounted on shaft 11 journaled in stands 12 and 13 fixed to plate 5. Clutch disk 14, fixed to shaft 11, is driven by three similar, spring-controlled, clutch driving pawls 15 mounted on the inner face of the drum. Clutch disk 16 is fixed to shaft 11 and its motion is limited to the direction indicated by arrow $16^a$ (Fig. 2) by spring-controlled, clutch retaining pawl 17 mounted on stand 12. Spring 18 is arranged within drum 10 having one end fastened thereto and the other end fastened to stand 12.

On the end of shaft 11 is mounted pinion 19 which engages gear 20 fixed to one end of master (pencil) roll 21 mounted on stud 22 fixed to stand 13. A second gear 23, fixed to said master roll, engages gear 24, fixed to the end of pressure roll 25 journaled in swinging frame 26 mounted on plate 5. Gear 20 engages gear 27 fixed on tubular shaft 28 mounted on stud 29 fixed to stand 13. On tubular shaft 28 is mounted winding roll 30 having an enlarged outer end $30^a$ for frictional engagement with the inner face of gear 27 and being interiorly enlarged at its inner end to receive spring 31 which encircles tubular shaft 28 and is held in adjustment thereon by nut 32 and check nut 33. Tubular shaft 28 is held in place longitudinally on stud 29 by screw $29^a$. Paper roll 34 is mounted on stud 35, fixed to the flanged hub 36 fixed to stand 13, and is interiorly enlarged at its inner end to receive spring 35ᵃ which encircles stud 35 and is held adjustably thereon by nut 37 and check nut 38. Guide roll 39 is mounted on stud 40 fixed to stand 13. Rolls 30 and 34 are furnished, respectively, at their outer ends with paper guiding flanges 41 and 41ᵃ and at their inner ends with similar paper guiding flanges 42, the latter comprising disks furnished with split tubular hubs 43 adapted to spring into the inner ends of said rolls and having knurled heads 44. These rolls are furnished, respectively, with spring clips 45 and 46 adapted to hold the paper thereon. Arm 47 of the swinging frame 26 is pivoted to link 48 which extends outwardly through yoke 49 mounted on plate 5 and has pivoted to its outer end the cam handle 50, which is adapted to raise said link and maintain it in a raised position; said link being lowered by controlling spring 51 arranged thereon within the yoke. Cord 9 passes from drum 10 over guide pulley 52 slidingly mounted on shaft 53 fixed in lugs 54 on plate 5.

The gage case is furnished with hinged cover 55, in the top of which over the master roll is inserted glass 56 providing a view of said roll; and which has an opening 57 through which the operator may mark the paper on said roll. Hood 55ᵃ, fixed to frame 13, protects the cord drum and gears. Cord 9 connects the gage mechanism with plunger head 58 of hydraulic press 59 mounted on frame 60, which is furnished with wheel support 61 and gage support 62. Said cord 9 passes over pulley 63 on press 59 and is fixed to stud 64 on plunger head 58. Pipe 65 connects the hydraulic press with the pressure gage. The frictional engagement of the paper roll 34 and that of the winding roll 30, with their respective bearings, as above described, should be so adjusted by the nuts 37 and 32, that the chart, while being kept always taut, may travel without any sliding motion between the master (pencil) roll 21 and the pressure roll 25. In other words, the pull upon the paper from the paper roll below, should approximately equal that from the winding roll above. As the chart winds upon the winding roll, it forms a roll of paper of constantly increasing diameter, which would cause it to wind too rapidly, were it not prevented from doing so by the described frictional engagement of said roll with the gear 27 provided for the purpose.

The operation is as follows: When the rolls are in operative position, as shown in the drawings, and before the beginning of an operation, for instance forcing a wheel upon an axle, the wheel (not shown) rests upon the frame 60 (Fig. 9) and against the support 61 and the axle (not shown) is suspended between the hub of the wheel and plunger head 58 ready to be driven into said hub by said plunger head. When pressure is introduced, the plunger head is driven outwardly, forcing the wheel upon its axle and pulling cord 9, thereby rotating drum 10 in the direction shown by arrow 16ᵃ (Fig. 2) and through the mechanism described winding the chart from the paper roll upon the winding roll; while the speed of the plunger head, which is not constant but varies with the different degrees of resistance met in the course of an operation, is communicated to the chart which travels relatively with the same varying speed. While the chart is being thus actuated, the pressure from the hydraulic press having entered spring tube 2 through pipe 65 expands said tube and moves the pencil over the moving chart in a well known manner. At each operation a diagram similar to that shown on the chart (Fig. 7) is made by the pencil and indicates by the longitudinal lines on the chart the degree of pressure at each successive instant of the operation and by the transverse lines on the chart the exact position of the wheel upon its axle at each successive instant, thus recording the distance, measured in inches, traveled by the axle and the exact pressure upon the axle at each position it assumes on entering the hub. For instance: Assuming the length of the axle to be 20 inches, the chart indicates that, when the wheel had advanced 5 inches upon the axle, the pressure was approximately 60 tons and that, when it advanced 10 inches, the pressure was approximately 80 tons, etc. The pressure normally increases as the axle advances, but sometimes, owing to imperfections of the parts, the axle suddenly advances quickly, or does not require the anticipated pressure, and the diagram indicates exactly at what point this happens. This is one purpose of the invention. When the operation is completed and the plunger returns to its normal position (Fig. 9), the drum is returned to its normal position by the spring 18, the clutch driving pawls 15 sliding over the clutch disk 14 which is held in *statu quo* by the clutch retaining pawl 17. Cam handle 50 is employed to separate the master roll and pressure roll, when desired, for the purpose of inserting a chart or for any other purpose. Through the opening 57 in the gage cover the operator may mark the chart for the purpose of identifying the particular operation.

Having described my invention what I claim and desire to secure by Letters Patent is—

1. In a chart support of the character described, coacting pencil roll and pressure roll having co-acting gears; said pressure roll being journaled in spring-controlled swinging arms; with controlling spring; substantially as described.

2. In a chart support of the character described, a spring-controlled tubular winding roll mounted rotatably and longitudinally movable upon a tubular shaft; said shaft being rotatably mounted and having a gear, the face of which frictionally engages one end of said tubular winding roll; with controlling spring; substantially as described.

In testimony whereof I have affixed my signature, in presence of two witnesses.

ARTHUR P. PHILLIPS.

Witnesses:
 RALPH W. FOSTER,
 GEORGE G. CLARK.

---

Copies of this patent may be obtained for five cents each, by addressing the "Commissioner of Patents, Washington, D. C."